June 17, 1952  E. L. GREENSFELDER  2,600,755
COVER RACK
Filed April 29, 1948
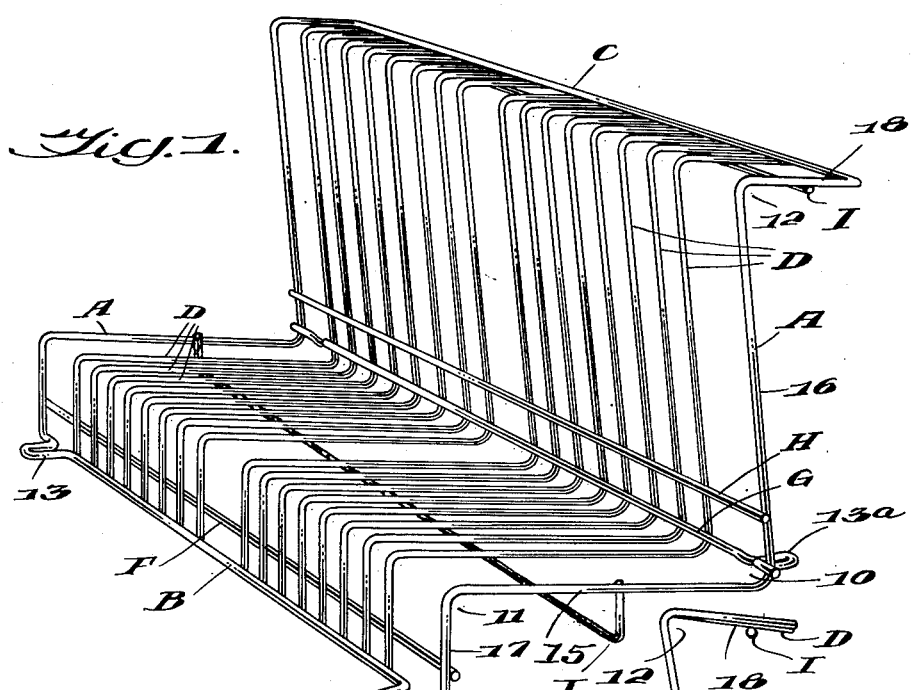
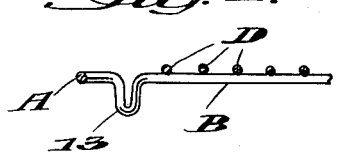
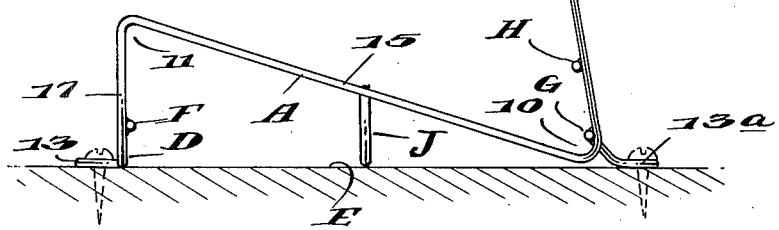
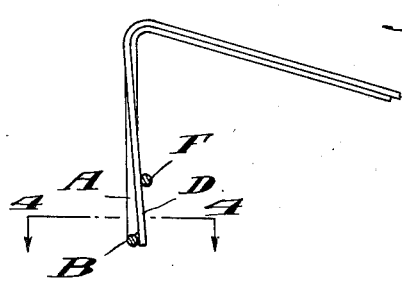
Inventor
ELMER L. GREENSFELDER,
By Hall + Haughton
Attorneys Patented June 17, 1952

2,600,755

UNITED STATES PATENT OFFICE 2,600,755

COVER RACK

Elmer L. Greensfelder, Provincetown, Mass.

Application April 29, 1948, Serial No. 23,935

7 Claims. (Cl. 211—41)

This invention relates to racks and aims to provide an improved rack particularly but not exclusively adapted for storing of utensil covers of various sizes and degrees of convexity.

In the average kitchen the housewife has numerous pots, pans, saucepans, kettles, etc., of various sizes and styles. Most of these covers are convexed upwardly to a greater or lesser degree, and provided with centrally located knobs or handles. Most of the covers are relatively thin at their edges though occasionally one has a dependent skirt flange making it relatively thick at its perimeter.

Particularly because of the limited space in modern kitchens it is the general practice to pile these covers helter-skelter in some cabinet space, usually in the same cabinet with the various pots and pans. With such helter-skelter storage when the housewife attempts to extract a particular pan or cover from the cabinet, it frequently occurs that a number of other covers cascade onto the floor. Piling of the covers in stove drawers and the like is not satisfactory, as this occupies a great deal of space and because of the tendency of the odd sizes and shapes to cant over, such piling of covers frequently interferes with the opening of the drawer and is generally a nuisance.

A general object of the present invention is to provide means for storing such odd sizes and shapes of covers, which may include a reasonable number of covers of the edge-skirted type, in a minimum of space, so that they are firmly retained while stored, and so that the storing and withdrawal of a particular cover may be accomplished without the inconvenience of prior practices.

Particular objects of the invention, severally and in various cooperating combinations, are to provide a novel form of rack preferably adapted to flex and receive pot and pan covers in mutually nesting relation; to provide a rack in which undue stressing of welded joints and the like is avoided; to provide a rack of simple and inexpensive construction; to provide a rack adapted for shelf or wall support; to provide a rack which affords visual guidance for insertion of the utensil covers to be housed; to provide a rack formed for efficient nesting for shipment; and generally to provide a rack of attractive appearance and utility.

Other objects and advantages of the invention reside in improved details of construction and novel features which will be apparent from the following description of a preferred embodiment thereof.

With the foregoing objects in mind the invention consists in a rack comprising a relatively stiff frame and provided with bar or wire formed opposed base- and back-grilles, at least one of which is preferably knee-forming and which preferably have rearwardly sloping portions and forwardly sloping portions for engaging and retaining the convex utensil covers and the like, and in the improved features and combinations hereinafter described and claimed.

In the accompanying drawings exemplifying the invention:

Fig. 1 is a perspective view;

Fig. 2 is a side elevation;

Fig. 3 is a detail in fore and aft vertical section; and

Fig. 4 is a detail in plan taken on the line 4—4 of Fig. 3 in the direction indicated by the arrows.

As is preferred, the rack in the form shown in the drawings is formed of a single continuous parallel bar-grille comprising side frame members A, end frame members B and C and longitudinal relatively resilient bars D. This grille in the form shown is bent transversely in one direction adjacent its center, as at the region 10, and in the opposite direction adjacent each of its ends, as at the regions 11 and 12, to give it a deeply centered inverted W-shape in the plane of its bars (Fig. 2). Means, such as the screw-receiving loop-elements 13, 13a, is provided for mounting the rack on a supporting surface with its center bend rearwardly directed to adapt it to receive utensil covers inserted from its front as indicated by the arrow 14, Fig. 2.

Preferably the respective sections 15, 16, 17, 18 of the W-shaped cross-section are arranged at angles of about sixty degrees to each other as shown, but these respective angles may be varied, say twenty degrees or more, without loss of the advantages of the invention.

For convenience herein the device will be described for the most part with reference to the mounting position shown in Figs. 1 and 2, regarding the surface E as a horizontal surface, but it is to be understood that the device may be mounted on a wall or otherwise and is not limited to mounting in the manner shown.

When mounted on a horizontal surface E as shown in Fig. 2, the base-grille section 15 preferably has a rearward slope at an angle of about fifteen to thirty degrees for the purpose hereinafter described; and when mounted on a vertical surface E (Fig. 2 rotated ninety degrees clockwise), the grille section 16 preferably has a similar rearward slope to the horizontal.

In the form shown the principal sections of the rack may be conveniently designated as a base-grille section 15 of spaced parallel bars, and an upstanding back-grille section 16 of spaced parallel bars coplanar with those of the base-grille section. In addition in the preferred form shown the rack is provided with other elements as the offset section 17 comprising coplanar extensions of the bars of the base section 15; the offset 18 likewise comprising extensions of the bars D; a cross-bar G secured to the frame and which in addition is preferably spot welded or otherwise secured to the grille bars D for strengthening the rack; and one or more cross-bars F, H, I, secured to the frame members A and freely bridging the grille wires D so that they do not interfere with movement of the grille bars D at the crossing points.

The mounting elements 13 are preferably formed as bends in the relatively rigid frame members ABC, and the mounting elements 13a are preferably formed on the bar G and extend through the grille as shown, as this reduces headroom requirements to a minimum compared to use of elevated leg members. The bends 13 in the member B may be duplicated in the member C if it is desired to provide for wall mounting without turning of the unit through ninety degrees.

The parallel grille bars D are preferably arranged in groups of bars spaced approximately one-half inch apart, with wider spaces between certain bars to accommodate covers of the widely bulged or edge-skirted types. These grille bars are preferably formed of relatively springy wire so they may be resiliently deflected from, and return to, the parallel position shown. The side frame members A are preferably of sufficient rigidity to be self-supporting. This renders use of brace members unnecessary and facilitates nesting of the devices, so that a large number of them may be shipped in a relatively small carton.

As is shown in Figs. 2 and 3, the wires D may be spot welded or otherwise secured to the frame members, herein the members B and C.

As convexed covers are inserted in the rack as indicated by the arrow 14, Fig. 2 (surface E being considered as horizontal), they are initially engaged between the laterally resilient knees of the bars D in the region 11 between the base section 15 and the offset section 17. As the knees and any covers already in the rack are exhibited, edge-on, to the housewife, a vacant space is easily selected. As the cover is pushed into the rack, it is given a slight twist or tilt away from an adjacent cover when the rack is crowded and thus the edge of one cover passes by the convexity or knob of the other and the two come into nesting relation. The flexing of the knees in the region 11 is important in this action and enables very compact storage to be effected. After the tilted cover has passed over the knob of the adjacent cover, it passes down the sloping base-grille section 15 and its rear edge engages in the upstanding grille section 16. The average convexed cover is then retained by the bars D with its more central convexed part engaging the adjacent bar in the base and back sections, and preventing it from descending between the bars, and with its opposite side in edge contact at two chordally related points with the next adjacent bar of the base section, and at two chordally related points with the colinear bar in the back section. Thus each lid of this type receives, in general, six points of support.

The cross bar F in the offset section 17 is particularly desirable, as it prevents the housewife from pressing the covers down toward the bar B to such an extent as to unduly exceed the elastic limit of the bars D and cause permanent deformation thereof or breaking of their junctions with the bar B. The extension of the bars D freely across the bar F to the bar B thus imparts additional resiliency to the knees.

In addition the bar F affords edge support for any flat covers which, because of lack of convexity, descend between the bars D sufficiently to come into contact therewith. To cooperate in this function it is preferred that a second cross bar, as bar H, be provided at the rear of the base section, and as noted it is preferred that this bar freely bridge the rack bars D so that the latter may have maximum resiliency.

In its preferred forms the rack is likewise adapted for wall mounting (Figs. 1 and 2 rotated clockwise ninety degrees), and for that purpose one or more additional cross bars are preferably provided. In the form shown the bar I, in offset section 18, may be used to serve the same purpose as bar F in offset section 17. Also, as a further precaution against small flat covers dropping through the rack when the latter is wall mounted, a further cover supporting cross-rod (as the rod H) may be provided, to limit the distance between bars H and I, or H and C, to less than the diameter of the smallest flat lid desired to be accommodated, or the section 15 and/or 16 may be provided with U-shaped cross rods such as the rod J.

It will be noted that in the preferred form the bent sections 17 and 18 make for compactness both in shipment and in use. They provide a relatively small overall dimension between bars B and C while providing for nesting for shipment. Also without decreasing the capacity of the rack they adapt it for use in relatively narrow shelving and in locations where headroom is cramped.

From the foregoing description of preferred embodiments of the invention, it will be appreciated that the invention is not limited to the precise forms shown, and that various details thereof may be omitted or embodied in other forms without sacrificing the advantages of other novel features.

I claim as my invention:

1. A rack of the class described having a base-grille section of spaced parallel grille wires and an upstanding back-grille section of spaced parallel grille wires coplanar with those of the base section, said rack having an offset section adjacent the front end of its base section and disposed at an angle thereto comprising two spaced cross bars and coplanar integral extensions of the grille wires of said base grille bridging freely across the near cross bar and joined to the remote cross bar so that lateral flexibility is imparted to the knees of said grille wires between said offset section and said base section and said near cross bar lying close to said grille wire extensions and preventing articles from descending deeply therebetween so that excessive stressing of the junctions of said extensions with said remote cross bar is avoided.

2. A rack of the class described comprising a frame having a front frame member, spaced parallel fore and aft grille wires secured to said frame and extending in a first section upwardly to a substantial distance from said front frame member, thence in a second section gradually downwardly and rearwardly for a second distance greater than said first named distance forming a base section, then from the rear corner of said base section in a third section sharply upwardly for a third distance approximately equal to said second distance, and thence in a fourth section rearwardly for a distance approximately equal to said first named distance where they are attached to a rear frame member, said grille wires being continuous throughout all four of said sections and presenting at the junctions between said first and second sections and between said third and fourth sections laterally flexible knees, said fore and aft grille wires being spaced to accommodate and support generally circular dished articles stored on edge between the aforesaid knees, said front and rear frame members being so located with respect to said rear corner that the plane defined by the front frame member and the rear corner and the plane defined by the rear frame member and the rear corner meet at substantially right angles at such rear corner, said rack having a single set of cooperating mounting means adjacent said front frame member and adjacent said rear corner and generally aligned with the plane defined by said front frame member and rear corner, so that by said single set of mounting means said rack is adapted for shelf mounting with said third section upstanding or for wall mounting with said second section upstanding, and presents substantially the same article supporting configuration in either position.

3. A rack according to claim 2 in which the respective sections of the defined W-shaped cross-section are disposed at angles of about sixty degrees to each other and in which each of said second and third sections extend in the direction of said grille wires approximately three times as far as do said first and fourth sections.

4. A rack according to claim 2, in which at least one of the respective sections of the defined W-shaped cross-section is provided with a cross bar fixedly positioned substantially in contact with but freely bridging the intermediate wires of said section at a point substantially spaced from the adjacent flexible knee bends and secured only to the two marginal wires of said section.

5. A rack of the class described comprising a frame having a front frame member, spaced parallel fore and aft grille wires secured to said frame and extending in a first section upwardly to a substantial distance from said front frame member, thence in a second section gradually downwardly and rearwardly for a second distance greater than said first named distance forming a base section, thence in a third section sharply upwardly for a third distance approximately equal to said second distance, and thence in a fourth section rearwardly for a distance approximately equal to said first named distance, said grille wires being continuous throughout all four of said sections and presenting at the junctions between said first and second sections and between said third and fourth sections laterally flexible knees, and said rack further comprising in at least one of said sections a transverse bar secured to said frame and lying close to but freely bridging the grille wires of said section for limiting the descent of stored elements between the grille wires of said section, thus preventing such elements from unduly stressing the junctions between said grille wires and said frame.

6. A rack according to claim 5 in which said transverse bar bridges the grille wires of said first section in spaced relation to said front frame member.

7. A rack according to claim 6 comprising two of said transverse bars, one of said transverse bars bridging the grille wires of said first section in spaced relation to said front frame member, and the other of said transverse bars bridging the grille wires of said third section proximate to the junction between said third and second sections.

ELMER L. GREENSFELDER.

REFERENCES CITED

The following references are of record in the file of this patent:

UNITED STATES PATENTS

| Number | Name | Date |
|---|---|---|
| 808,142 | Danhour | Dec. 26, 1905 |
| 934,721 | Garretson | Sept. 21, 1909 |
| 1,254,287 | Sterling | Jan. 22, 1918 |
| 1,360,192 | Davidson | Nov. 23, 1920 |
| 1,822,087 | Feingold | Sept. 8, 1931 |
| 1,900,053 | Glidden | Mar. 7, 1933 |
| 2,010,734 | Parker | Aug. 6, 1935 |

FOREIGN PATENTS

| Number | Country | Date |
|---|---|---|
| 432,081 | Great Britain | July 19, 1935 |